United States Patent Office 3,096,299
Patented July 2, 1963

3,096,299
POLYVINYL FLUORIDE DISPERSED IN
DIMETHYL SULFOXIDE
James Simpson Proctor, Amherst, Mass., assignor to E. I. du Pont de Nemours and Company, Wilmington, Del., a corporation of Delaware
No Drawing. Filed Jan. 17, 1961, Ser. No. 83,165
2 Claims. (Cl. 260—30.8)

This invention relates to compositions of matter, and more particularly to novel film-forming compositions suitable for the manufacture of polyvinyl fluoride film. This application is a continuation-in-part of my copending application Serial No. 748,795, filed July 16, 1958, now abandoned.

The preparation of orientable polyvinyl fluoride is described in U.S. Patents 2,419,008, 2,419,010, 2,510,783, and 2,599,300. Although films of polyvinyl fluoride have been described, no entirely satisfactory film-forming techniques have heretofore been devised. With polyvinyl fluoride high enough in molecular weight that films produced therefrom have useful property levels, melt viscosities, even at temperatures well above the crystalline melting temperature of the particular polymer are too high to permit the production of film therefrom by conventional melt extrusion techniques. Attempts to increase the fluidity of the melt by raising its temperature lead to thermal decomposition of the polymer which occurs at temperatures above approximately 220° C., evidenced chiefly by a brownish discoloration of the film. As a matter of fact, even with radically modified, massive, heavy-duty equipment it has not been possible to melt extrude films of these higher molecular weight polyvinyl fluorides by conventional melt extrusion techniques.

The casting of the films by flowing solutions of the polymer onto suitable surfaces and subsequently volatilizing the solvent would seem to offer a means of avoiding the problems of thermal instability and high melt viscosity associated with melt extrusion. Unfortunately, however, polyvinyl fluoride is insoluble in commonly used volatile solvents such as acetone, petroleum ether, isooctane, xylene, carbon tetrachloride, chloroform, methanol, ethanol, etc., and polyvinyl fluorides of high inherent viscosity (high molecular weight), which are preferred for film manufacture, are only very slightly soluble even in hot solvents such as hot dimethylformamide, tetramethylene sulfone, nitroparaffins, cyclohexanone, dibutyl ketone, mesityl oxide, aniline, phenol, methyl benzoate, phenyl acetate and diethyl phosphate. While the use of hot solutions to accomplish solvent casting techniques has met with some success, it does present serious problems from the standpoint of equipment and safety requirements.

Further, all orientable polyvinyl fluorides do not enjoy even the same degree of limited solubility indicated above. For example, those orientable polyvinyl fluorides produced according to procedures described in U.S. Patents 2,510,783 and 2,599,300, even in the relatively low molecular weight ranges, are not completely soluble even in hot solvents. As polymer molecular weight increases into the more useful range, this degree of intractability increases markedly to the point where undissolved polymer gel may exist even at the boiling point of the solvent. The presence of gel structures precludes the manufacture of homogeneous polyvinyl fluoride film by solution casting of the higher molecular weight polymer.

Furthermore, film formation by solution casting techniques is normally characterized by relatively low throughput efficiency; for example, film yields from a pound of solution commonly range between 0.1 and 0.25 pound. For economy of manufacture rather extensive solvent recovery and recycling facilities must normally be provided, in addition to rather extensive precautions relating to the toxicity and fire hazards inherent in such operations.

The primary object of this invention, therefore, is to provide a film-forming composition containing as the film-former polyvinyl fluoride of relatively high inherent viscosity, which composition may be readily converted by extrusion techniques into a self-sustaining film at a satisfactory throughput efficiency under such conditions that the polymer is not subjected to thermal degradation. Other objects will appear from the description which follows.

These objects are realized by the present invention which, briefly stated, comprises a stable fluid composition comprising essentially an admixture of particulate polyvinyl fluoride and dimethyl sulfoxide, said composition containing from 5% to 85% by weight of polyvinyl fluoride, based on the total weight of polyvinyl fluoride and dimethyl sulfoxide, and capable of being cast to form a self-supporting film of polyvinyl fluoride.

Polyvinyl fluoride preferred for the film-forming compositions of this invention is of the orientable type, preferably having an inherent viscosity of at least 0.35, and is employed in said film-forming compositions in the form of discrete particles, said particles having a minimum average diameter of not less than about 0.005–0.010 micron.

Dimethyl sulfoxide has substantially no solvent action on polyvinyl fluoride at room temperature, but is capable of coalescing particles of polyvinyl fluoride at elevated temperatures, i.e., is a latent solvent for the polymer.

Although the polyvinyl fluoride content of the film-forming composition may vary within the range of from 5% to 85% by weight, the optimum ranges will vary according to the casting technique to be employed. Thus, where the mixture consisting of particulate polyvinyl fluoride uniformly mixed with dimethyl sulfoxide is to be extruded into a coalescing hot oil bath, polyvinyl fluoride content may range from 25% to 40% by weight, preferably from 30% to 35%. Where the mixture is to be extruded onto a plate or belt at room temperature, followed by heating in air to coalesce, the polyvinyl fluoride content may range from 10% to 60% by weight, preferably from 30% to 40%. And, where the mixture is to be extruded as a hot coalesced mass into a cold quench bath, the polyvinyl fluoride content may range from 20% to 85% by weight, and preferably from 40% to 60% of the composition. These mixtures, depending on the proportions of their ingredients, may range in consistency from fluffy, damp, free-flowing powders through heavy pastes and viscous liquids to freely flowing liquids. The mixtures constituting the film-forming compositions of this invention are, in all of the above-described consistencies, two-phase systems consisting of solid, particulate polyvinyl fluoride (the dispersed, internal or discontinuous phase) and the aforementioned organic compound (the dispersion medium; the external or continuous phase), and are thereby readily distinguishable from true polymer solutions which constitute homogeneous single-phase systems.

Preferably the mixtures constituting the film-forming compositions of this invention are in the form of stable dispersions, prepared by mixing or blending the solid polymer in dimethyl sulfoxide by any convenient expedient. Mixing time will vary and will depend on the nature of the equipment chosen, the size of the charge in relation to the capacity of the mixer and the percent dimethyl sulfoxide in the charge.

In addition to the homopolymer, this invention embraces compositions of matter comprising mixtures of dimethyl sulfoxide with copolymers of vinyl fluoride with other mono-ethylenically unsaturated monomers copolymerizable therewith, wherein the vinyl fluoride is present in substantial or in major amounts; i.e., at least 75%—

80% of the total by weight. Examples are mono-ethylenic hydrocarbons, e.g., ethylene, propylene, isobutylene, and styrene; halogen-substituted ethylenes, e.g., vinyl chloride, vinyl bromide 1,1-dichloroethylene, 1,1-difluoroethylene, difluorochloroethylene, trifluorochloroethylene, tetrafluoroethylene, trifluoropropylene and difluoroisobutylene; vinyl esters, e.g., vinyl formate, vinyl acetate, vinyl propionate, vinyl butyrate, vinyl pivalate, vinyl benzoate, vinyl stearate, vinyl salicylate and vinyl esters of inorganic acids; vinyl ethers, e.g., vinyl ethyl ether, tetrafluoroethylallyl ether and vinyl dioxolane; vinyl ketones; e.g., methyl vinyl ketone; N-vinyl imides, e.g., N-vinyl succinimide and N-vinyl phthalimide; acrylic and methacrylic acids and derivatives, e.g., esters, amides, anhydrides and acid halides, including methyl methacrylate, beta-hydroxyethyl methacrylate, allyl methacrylate, n-butyl methacrylamide, etc.; derivatives of maleic and fumaric acids, e.g., diethyl maleate and dimethyl fumarate; propenyl esters, e.g., allyl acetate and isopropenyl acetate.

The following specific examples of preferred embodiments further illustrate the principles and practice of this invention. Parts and percentages are by weight unless otherwise indicated.

In the following examples, polyvinyl fluorides of varying inherent viscosities are employed. Inherent viscosity is measured by dissolving polyvinyl fluoride in hexamethylphosphoramide by violently agitating the mixture of an elevated temperature. The solution is cooled to 30° C., and the viscosity of this solution is measured relative to that of the solvent treated in the same manner. The time of efflux through a viscosimeter is measured for the solvent (no polymer present) and the solution of polymer in solvent. Inherent viscosity is calculated as follows:

Let $T_0$ = solvent flow time in seconds
$T_1$ = solution flow time in seconds

Relative viscosity $= \dfrac{T_1}{T_0}$

Inherent viscosity
$$= \dfrac{\text{the natural logarithm of relative viscosity}}{C}$$

where C is the concentration expressed in grams of polymer per 100 milliliters of solution.

In the following examples, $C = 0.05$ g./100 ml. in all cases.

Example 1

510 parts of dimethyl sulfoxide were introduced into a Waring Blendor. The blender was operated at a speed of from 500 to 1000 r.p.m. while 240 parts of particulate polyvinyl fluoride of inherent viscosity 2.6 were added to the dimethyl sulfoxide, and then continued to operate at this speed for about 20 minutes. Precautions were taken to prevent any appreciable temperature rise during mixing. After a short burst at a speed of approximately 8000 r.p.m., the resulting dispersion, 32% polyvinyl fluoride, by weight, was poured into a shallow vessel in order to expose as large a surface per unit of volume as practical.

To remove all entrapped air bubbles, the dispersion was then subjected to high vacuum overnight. The deaerated dispersion was transferred to a feed reservoir which was connected to a slotted, oil-cooled casting hopper whose lips were immersed to a depth of approximately 1/16 inch to 1/8 inch in a heated bath of white mineral oil.

By means of air pressure at approximately 5 p.s.i. gauge, and with the opening of the hopper lips set at approximately 12 mils, the dispersion was extruded into the oil bath which was maintained at approximately 157° C. As the dispersion left the lips of the casting hopper, it coalesced immediately to form a self-supporting film, which, after traveling about 1 to 2 inches through the hot oil bath, was conducted into a bath of cooler white mineral oil, maintained at about 30° C. On removal from the cooling bath, both mineral oil and dimethyl sulfoxide were extracted by washing the film in acetone. The film was then clamped in a frame and allowed to dry naturally.

Example 2

A 40% solids polyvinyl fluoride/dimethyl sulfoxide dispersion prepared as in Example 1 was allowed to deaerate under high vacuum for about 2 hours. The polymer had an inherent viscosity of 2.6. After transfer to the feed reservoir, it was extruded under 10 p.s.i. gauge air pressure into the oil bath which, in this instance, was maintained at 182° C. Again, as in Example 1, a self-supporting film formed immediately, and was conducted from the coalescing bath into the cooling bath, the latter maintained at about 30° C.

On removal from the cooling bath, oil was removed by wiping, the film then clamped in a frame and exposed for about 25 minutes to a current of heated air to volatilize the dimethyl sulfoxide.

Example 3

350 grams of particulate polyvinyl fluoride of inherent viscosity 2.2 were coarsely mixed with 650 grams of dimethyl sulfoxide, and then this 35% solids mixture charged into a water jacketed stainless steel cylinder, fitted with a screened orifice (200–300 mesh) near the base. A rotatable ½ inch diameter shaft on which were mounted three ¼ inch thick discs was centrally located within the cylinder. The shaft was connected to a ⅓ H.P. electric motor. Approximately one kilogram of carefully washed and dried "Ottawa sand" of 20–30 mesh occupied about ⅓ of the free space in the cylinder.

The shaft was rotated at 1800 r.p.m. for about 8 minutes. During this time, an intimate mixture of sand and dispersion was formed by the rotating discs and flowed downward toward the orifice, where the sand was restrained by the fine screen while a smooth agglomerate-free dispersion of polyvinyl fluoride in dimethyl sulfoxide was delivered into a receiver at a temperature of approximately 25° C. Cooling water was circulated through the cylinder jacket to prevent any appreciable rise in temperature during mixing. The dispersion was then deaerated by confining it under a high vacuum for several hours.

After deaeration, this smooth dispersion was transferred from the receiver and continuously cast at approximately room temperature through a flexible hose into a pool on the surface of a highly polished endless stainless steel belt moving at approximately 2 feet per minute. The belt then carried the dispersion first under a vertically adjustable, beveled doctor knife and then into a zone blanketed by nitrogen having a relatively low linear velocity where it was heated rapidly to a temperature of 140° C. A tough, pliable film was continuously stripped from the moving belt.

Example 4

Employing particulate polyvinyl fluoride having an inherent viscosity of 4.9, a 10% solids dispersion of the polymer in dimethyl sulfoxide was prepared following the procedure of Example 1. After deaeration, this smooth, rather fluid dispersion was spread on a flat polished ferrotype plate and placed in an oven maintained at approximately 130° C. After about 90 seconds exposure to these conditions, the polyvinyl fluoride particles coalesced to form a translucent gel film. After coalescence, the film, containing most of the original dimethyl sulfoxide, was quenched by immersing the plate in cold water. The film was then stripped from the plate, clamped in a frame to prevent shrinkage and placed in a current of heated air to volatilize the dimethyl sulfoxide. The solvent-free film was again quenched in cold water and removed from the frame. The resulting film, approximately 2 mils thick, was found to be quite tough and pliable.

Example 5

A 60% solids dispersion of polyvinyl fluoride of inherent viscosity of 2.2 and dimethyl sulfoxide was prepared as in Example 3. After deaeration the resulting smooth dispersion was spread on a flat polished steel plate and placed in an oven at 165° C. for approximately 1½ minutes. Under these conditions, the polyvinyl fluoride particles coalesced to form a translucent gel film. After coalescence, the film containing most of the original dimethyl sulfoxide was quenched by immersing the steel plate in cold water. The film was then stripped from the plate, clamped in a frame to prevent shrinkage and placed in a forced-air circulation oven to volatilize the dimethyl sulfoxide. On removal from the oven, the film was again quenched in cold water and removed from the frame. The resulting film was approximately 12 mils thick.

Example 6

8 pounds of particulate polyvinyl fluoride with an inherent viscosity of 2.5 were blended with 2 pounds of dimethyl sulfoxide by mixing for 15 minutes in a Model A-200 Hobart mixer at a planetary speed of 86 r.p.m. and a beater speed of 198 r.p.m. The resulting 80% solids dispersion had a damp powder-like consistency. The dispersion was fed to a heated extruder and from there to a slotted steel casting hopper maintained at 185° C. from which it was extruded continuously as a hot coalesced gel into a water bath maintained at about 10° C., producing a tough, flat sheet about 5 mils thick.

Example 7

Using a polyvinyl fluoride with an inherent viscosity of 3.2, a 48% solids dispersion in dimethly sulfoxide was formed following the procedure used in Example 6. The resulting dispersion was considerably more fluid than that of Example 6. It was extruded in the same manner at 160° C., and quenched in a water bath maintained at 10° C. The resulting tough, pliable flat sheet was exposed in a current of heated air for about 10 minutes, producing a substantially solvent-free film 12 mils thick.

Example 8

Using a polyvinyl fluoride with an inherent viscosity of 4.9, a 25% solids dispersion in dimethyl sulfoxide was formed following the procedure used in Example 6. It was extruded in the same manner as the dispersion in Example 6 at a hopper temperature of approximately 160° C., and quenched in a water bath maintained at about 8° C. A substantially solvent-free film approximately 6 mils thick was produced after exposing the quenched film, clamped in a frame, to a current of heated air for about 10 minutes.

The advantages of this invention are attributable to the great versatility of dimethyl sulfoxide, which lends itself to mixing and blending in almost unlimited and variable portions with polyvinyl fluoride. Dimethyl sulfoxide is a liquid at room temperature which permits mixing to be accomplished without the additional complication of maintaining extensive and elaborate heating facilities. The compositions of this invention cover a broad spectrum of solids content and may be formed into such shaped structures as films with a variety of equipment and under a wide variety of conditions as shown in the foregoing examples. Use of dimethyl sulfoxide permits a very broad approach to the long-standing problem of polyvinyl fluoride film formation. It permits the realization of processes having satisfactory through-put efficiency without extraordinary investment in equipment and without risking degradation to the polymer itself. It further permits the formation of films from polyvinyl fluorides in the higher molecular weight ranges. It is to be understood that although the compositions of this invention are chiefly applicable in the manufacture of film, they are useful as well for the preparation of other shaped structures, e.g., fibers, filaments, rods, tubes, etc.

Dimethyl sulfoxide is quite thermally stable below its boiling point and relatively non-corrosive to materials of construction. Its use does not require any extraordinary precautions from either the toxicity or the flammability standpoints.

I claim:

1. A film-forming composition capable of being formed into a self-supporting film consisting essentially of particulate polyvinyl fluoride stably dispersed in dimethyl sulfoxide, said polyvinyl fluoride constituting from about 5% to about 85% of the total weight of the dispersion, the polyvinyl fluoride particles having a minimum average diameter of not less than about 0.005–0.010 micron.

2. A composition of claim 1 wherein the polyvinyl fluoride has an inherent viscosity of at least 0.35.

No references cited.